US006366236B1

(12) United States Patent
Farmer et al.

(10) Patent No.: US 6,366,236 B1
(45) Date of Patent: Apr. 2, 2002

(54) NEURAL NETWORK RADAR PROCESSOR

(75) Inventors: Michael E. Farmer, West Bloomfield; Craig S. Jacobs, Farmington Hills; Shan Cong, Ann Arbor, all of MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/637,044

(22) Filed: Aug. 11, 2000

Related U.S. Application Data (60) Provisional application No. 60/148,597, filed on Aug. 12, 1999.

(51) Int. Cl.⁷ .............................................. G01S 13/00
(52) U.S. Cl. ........................ 342/195; 342/118; 342/200
(58) Field of Search ................................ 342/195, 118, 342/200

(56) References Cited

U.S. PATENT DOCUMENTS

| | | | |
|---|---|---|---|
| 4,803,736 A | * 2/1989 | Grossberg et al. | |
| 5,235,339 A | 8/1993 | Morrison et al. | ........... 342/159 |
| 5,247,303 A | * 9/1993 | Cornelius et al. | ............. 342/26 |
| 5,287,430 A | 2/1994 | Iwamoto et al. | ............... 395/22 |
| 5,345,539 A | 9/1994 | Webb | .......................... 395/22 |
| 5,377,108 A | 12/1994 | Nishio | .................... 364/424.05 |
| 5,398,300 A | 3/1995 | Levey | ......................... 395/22 |
| 5,541,590 A | 7/1996 | Nishio | ........................ 340/903 |
| 5,613,039 A | 3/1997 | Wang et al. | .................... 395/22 |
| 5,684,701 A | 11/1997 | Breed | .................. 364/424.055 |
| 5,694,320 A | 12/1997 | Breed | .................. 364/424.055 |
| 5,740,326 A | * 4/1998 | Boulet et al. | .................. 395/27 |
| 6,236,942 B1 | * 5/2001 | Bush | ........................... 702/14 |

OTHER PUBLICATIONS

"NeuroSolutions On–line Help", Principe, J.; Lefebvre, C.; Lynn, G.; Fancourt, C.; Wooten, D., Version 3.01, Nov. 14, 1997.

Perko, M.; Iztok Fajfar, I.; Tuma, T.; Puhan, J., "Fast Fourier transform computation using a digital CNN simulator", Fifth IEEE International Workshop on Cellular Neural Network and Their Applications, London, England, Apr., 1998.

"Subthreshold Analog Circuit Design for Computing Three Principal Components", Salam, F.M.A and Vedula, S.S.

Fujii, S., "Neural network processing of FMCW Doppler radar", SPIE vol. 2315, pp. 383–389, 2/94.

Gharbi, A.B.A. and Salam, F.M.A., 'Separation of Mixed Signals in Dynamic Environments: Formulation and Some Implementation', Proceedings of the IEEE Midwest Symposium on Circuits and Systems, Aug. 3–7, 1994, pp. 1–4.

Satoshi Fujii and Keigo Lizuka, "Neural network step–frequency fault locator", Optical Engineering, vol. 34, No. 5, pp. 1441–1449, 1995.

\* cited by examiner

Primary Examiner—Theodore M. Blum
(74) Attorney, Agent, or Firm—Dinnin & Dunn, P.C.

(57) ABSTRACT

A neural network radar processor (10) comprises a multilayer perceptron neural network (100.1) comprising an input layer (102), a second layer (122), and at least a third layer (124), wherein each layer has a plurality of nodes (108), and respective subsets of nodes (108) of the second (122) and third (124) layers are interconnected so as to form mutually exclusive subnetworks (120). In-phase and quadrature phase time series from a sampled down-converted FMCW radar signal (19) are applied to the input layer, and the neural network (100) is trained so that the nodes of the output layer (106) are responsive to targets in corresponding range cells, and different subnetworks (120) are responsive to respectively different non-overlapping sets of target ranges. The neural network is trained with signals that are germane to an FMCW radar, including a wide range of target scenarios as well as leakage signals, DC bias signals, and background clutter signals.

18 Claims, 6 Drawing Sheets

| Parallel Processor 1 | Read A/D 1 | Read A/D 2 | Read A/D 3 | Read A/D 4 | | | | |
|---|---|---|---|---|---|---|---|---|
| Parallel Processor 2 | | Leakage DC Bias | Leakage DC Bias | Leakage DC Bias | Leakage DC Bias | | | |
| Parallel Processor 3 | | | FFT 1 | FFT 2 | FFT 3 | FFT 4 | | |
| Parallel Processor 4 | | | | Peak Find 1 | Peak Find 2 | Peak Find 3 | Peak Find 4 | |

Time →

Fig. 1.a.

| Single Processor | Peak Find 0 | Read A/D 1 | Leakage DC Bias | FFT 1 | Peak Find 1 | Read A/D 2 | Leakage DC Bias |
|---|---|---|---|---|---|---|---|

Time/4 →

$$Y = W_O \cdot F^\alpha \left( \sum_{i=1}^{N} G^\beta (W_i \cdot X_i) \right)$$

FIG. 6b.

NEURAL NETWORK RADAR PROCESSOR

CROSS-REFERENCE TO RELATED APPLICATIONS

The instant application claims the benefit of prior U.S. Provisional Application Ser. No. 60/148,597 filed on Aug. 12, 1999, which is incorporated herein by reference.

TECHNICAL ART

The instant invention generally relates to systems and methods for detecting targets from radar signals and more particularly to systems and methods utilizing neural network processing to detect targets from a Frequency Modulated Continuous Wave (FMCW) automotive radar.

BACKGROUND OF THE INVENTION

A vehicle may contain automatic safety restraint actuators that are activated responsive to a vehicle crash for purposes of mitigating occupant injury. Examples of such automatic safety restraint actuators include air bags, seat belt pretensioners, and deployable knee bolsters. One objective of an automatic restraint system is to mitigate occupant injury, thereby not causing more injury with the automatic restraint system than would be caused by the crash had the automatic restraint system not been activated. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature, or with weak constitution, such as children, small adults or people with frail bones, are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

Known deployment systems for vehicle safety devices such as an air bag require the host vehicle to actually collide with an obstacle or other vehicle before the deployment decision process begins. At that point in time, the sensors detect a deceleration in the host vehicle and deploy one or more safety systems. Thus, the crash is identified based solely on the characteristic of the acceleration versus time measure. The disadvantage with existing post-crash detection systems derives from the fact that the time available to deploy an active safety device is relatively short, particularly for side impact or high speed frontal collisions where occupant restraint systems can provide significant safety benefits. These short time frames lead to rates of inflation of the air bags that are so great that injury or death are possible if the occupant is not properly situated with respect to the air bag.

Ideally, the air bag would be inflated prior to any interaction with a normally seated occupant, and at a rate which is sufficiently slow that an out of position occupant would not be injured by the inflating air bag. For a crash of sufficient severity, this requires the crash sensing system to be able to predict immanent crashes because the time required to inflate the bag at an inflation rate sufficiently slow to be safe for out-of-position occupants may be greater than either that required for the occupant to move so as to commence interaction with an inflated air bag or to safely decelerate the occupant.

Typically, predictive collision sensing systems utilize radar to sense the range and possibly velocity of a target relative to the vehicle. A radar system measures the distance and/or velocity of a target by sensing the effects of the interaction of the target with a beam of wave either continuous or pulsed energy, whereby the range to the target is determined by measuring the transit time of the radar signal, and the velocity of the target is determined by measuring the Doppler frequency shift of the received backscattered signal relative to the transmitted signal.

Frequency Modulated Continuous Wave (FMCW) radar generally operates by illuminating one or more targets with a constant amplitude transmitted signal which is frequency modulated over time. In a Linear FMCW (LFMCW) radar, the frequency modulation is linear with respect to time, or in other words, the transmitted signal is chirped—either up-chirped, down-chirped, or a combination of the two where the associated direction indicates the relative change in frequency with time. The transmitted signal is backscattered off each target back to an associated receiver, thereby undergoing a propagation delay which is proportional to the range of the target relative to the transmitter and receiver. For each point of reflection on each target, the corresponding received signal has a time varying frequency content similar to the transmitted waveform but shifted in time by a time delay proportional to the time required for the signal to travel from the transmitter to the target and then to the receiver. For a system with the transmitter and receiver relatively fixed with respect to one another, this time delay is also proportional to the range of the target thereto. Typically, the transmitter and receiver either share a common antenna, or utilize separate antennas which are in close proximity to one another. The received signal is recombined with either the transmitted signal, or a replica thereof as generated by a local oscillator, to produce a intermediate signal having a beat or intermediate frequency which is proportional to the target range. Alternately, the received signal may be separately combined with two different local oscillator signals, one of them being in-phase with the transmitted signal, the other being in phase quadrature thereto, which both effectively increases the sampling rate and enables a distinction with respect to the sign of the Doppler shift in the received backscattered signal in accordance with the associated target velocity. A sequence of received backscattered signals may be used to unambiguously resolve both target range and target velocity.

Some of the advantages of FMCW radar compared with other types of radar are 1) the modulation thereof is readily compatible with a wide range of solid-state transmitters, 2) the measurement of frequency necessary for range measurements can be performed digitally using a Fast Fourier Transform (FFT), and 3) the FMCW signals are relatively difficult to detect with conventional intercept receivers.

Traditional Linear Frequency Modulated (LFM) signal processing of a continuous wave (CW) radar signal requires a number of steps of processing including: 1) read the A/D converters and format the resulting data, 2) remove leakage, DC bias and in-phase/quadrature-phase imbalance in the received signal, 3) Fourier Transform processing, and 4) peak finding and detection and Constant False Alarm Rate (CFAR) detection.

Figure 1A:
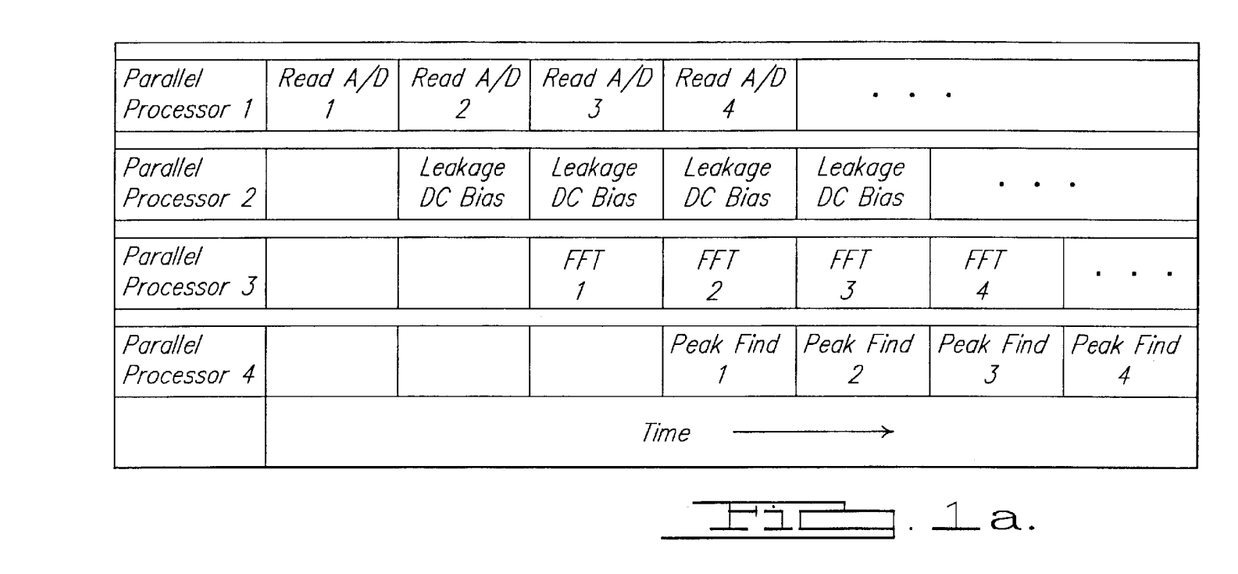
FIG. 1a illustrates the LFMCW radar processing operations as implemented by a plurality of parallel processors.
Figure 1B:
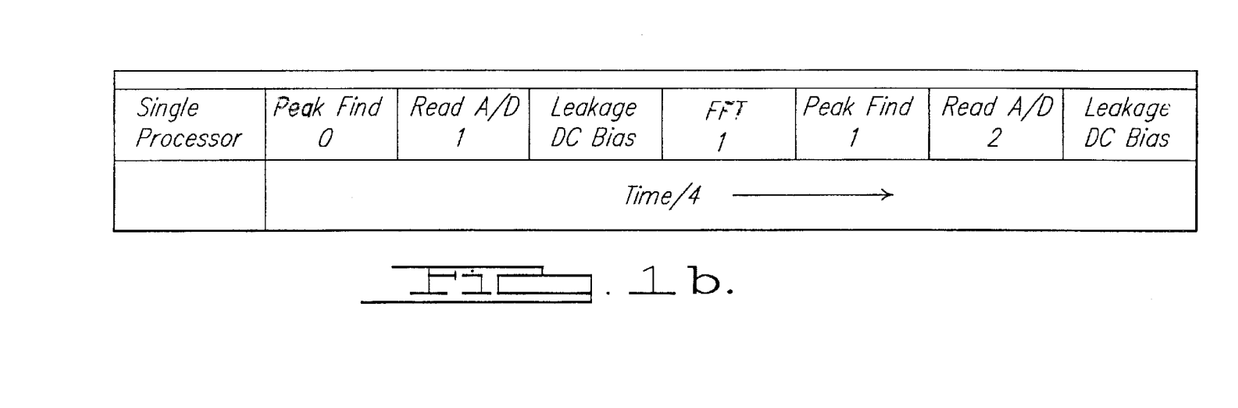

This processing is inherently pipelined (serial) in time rather than parallel in time which leads to significant processing throughput requirements, depending on the LFM sweep update time. The only way to effectively parallelize the algorithm is to either context switch between tasks on a single processor that operates four times as fast as a single task requires or to have four dedicated processors, one for each task as seen in FIG. 1a. Alternately as illustrated in FIG. 1b, if a single time-slicing processor is used it requires four times the clock speed needed to execute a single task, and therefore is more expensive and requires more power.

The problem is further complicated since the signal experiences a significant amplitude gain through the FFT processing (Order($N^2$) growth in amplitude), which requires the processing hardware to have large data word sizes to prevent overflow and to avoid the need for on-the-fly data scaling which can effect the final signal to noise ratio of the system. This is highly inefficient since the FFT amplitude values can require up to 32 bits to encode with no clipping but the final target detection values are limited to the maximum range of the system which is 50–100 meters and is encodable in 6–7 bits.

Generally in a continuous wave radar system, a leakage signal is always present together with the signal backscattered by targets. Moreover, the leakage signal often has a much higher amplitude than the target signal, so that subtracting the leakage can be an important step in the signal processing of CW radar in order to extract a useful target signal. A Kalman filter may be employed to track the leakage amplitude and deduce the amount to be subtracted from each sample to account for the leakage.

For systems requiring multiple antenna beams, a leakage signal for each beam would typically be stored in computer memory, which can be relatively memory intensive. The leakage signal results from a component of the transmitted signal which leaks into the receiver without first interacting with the target. The amount of signal leakage is generally greater for systems where the transmit and receive circuits share a single antenna, than for systems having distinct transmit and receive antennas. This leakage signal is generally collected through a dedicated calibration process, where the antenna is aimed at the sky and data is collected for each beam. This calibration may also be temperature dependent depending on the materials use to develop the antenna array, so that even more leakage signals would need be collected and stored in order to compensate for this effect.

As a signal is always mixed with noise, a group of potential target ranges generally appears after all the above processing. To obtain the ranges of true targets and maintain a stable false alarm rate, the detection process employs an order statistics based approach for the constant false alarm rate detection.

The principal disadvantages of prior art FMCW signal processing methods include the following 1) high computer hardware throughput requirements, 2) large computer hardware data word sizes, 3) large amounts of memory, 4) excessive power requirements (due to high performance processor chips), 5) large amounts of software due to all the aspects of the algorithm, and 6) leakage signal and DC bias signals can mask small targets unless specifically removed from processing.

Neural networks are known for providing a general and robust framework for the approximation of a variety of functions. For example, it is known that a neural network can approximate an FFT function, particularly for FMCW radar signal processing. Neural networks are also known for solving classification or discrimination problems, for example determining whether a point represented by a particular input vector is inside or outside of a particular region.

A variety of neural networks of various topologies are known, including the perceptron, the multilayer perceptron, the MADALINE, radial basis function networks, associative memories, Jordan/Elman networks, Hopfield networks, principal component analysis networks, Kohonen self-organizing maps (SOFM), adaptive resonance theory (ART) networks, Fukushima Neocognitron networks, and time lagged recurrent networks. In general, neural networks comprise an interconnected set of processing elements, wherein each processing element comprises at least one weighted input and an output, wherein the value of the output is given by a generally non-linear transformation of the linear combination of the weighted inputs. The values of the weights for each processing element are established through a training process, for example backpropagation, wherein a set of inputs are provided, the resulting output response of the neural network is compared with the desired output, and the values of the weights for one or more inputs to one or more processing elements are adjusted so that the output response is changed towards the desired response.

The perceptron comprises a feedforward neural network with no hidden processing elements, that is capable of discriminating amongst linearly separable classes. For example, in two dimensions with inputs x1 and x2, a processing element having an output y that implements the threshold function y=U(x1−x2), where U is the unit step function, is able to classify points as to their location (above or below) relative to the line x1=x2.

The multi-layer perceptron (MLP) comprises one or more hidden layers of processing elements between the input and output layers, wherein the outputs from the input layer are inputs to the first hidden layer, the outputs from the last hidden layer are inputs to the output layer, and the outputs from one hidden layer are inputs to the next corresponding hidden layer. For static classification, the MLP with two hidden layers is a universal pattern classifier, wherein the discriminant functions can take any shape.

The Hopfield network is a recurrent neural network with no hidden nodes and with symmetric weights, wherein the processing elements comprise adders followed by a threshold nonlinearity, whereby the network is stable in the sense of Lyapunov so that the state of the system approaches the nearest equilibrium point for a given set of inputs. With fixed weights corresponding to pre-selected equilibrium points, the Hopfield network acts as an associative memory, with some of the same features as human memory.

Known neural network systems either do not involve FMCW collision radar, or do not teach or suggest systems or methods for solving the problems peculiar to FMCW collision radar, such as the removal of leakage and DC bias from the detected backscattered radar return signal.

SUMMARY OF THE INVENTION

The instant invention overcomes the above-noted problems by providing a system and method of processing a radar signal using a neural network that processes the intermediate frequency in-phase and quadrature phase signals sampled in time from a FMCW radar to detect the range of targets illuminated by the associated radar transmit signal, wherein the result of processing by the neural network is similar to the result from the conventional FMCW signal processing steps of DC bias removal, leakage removal, Fast Fourier Transformation, and CFAR detection. The associated neural network radar processor can be implemented on a neural network processor chip for reduced cost and improved reliability. The instant invention also provides a method of training the neural network with signals that are germane to an FMCW radar, including a wide range of target scenarios as well as leakage signals, DC bias signals, and background clutter signals.

In accordance with a first aspect, a neural network radar processor comprises a multilayer perceptron neural network comprising an input layer, a second layer, and at least a third layer, wherein each layer has a plurality of nodes. Each node of the input layer is operatively connected to every node of the second layer. The second and third layers comprise a plurality of subsets of nodes, wherein nodes from one subset of the third layer are operatively connected only to nodes of one subset of the second layer, there being a one-to-one correspondence between subsets in the second and third layers. The respective interconnected subsets constitute respective mutually exclusive subnetworks. The outputs of the nodes in the third layer are operatively connected to outputs of the neural network, and the neural network is trained so that each output node is responsive to a target at in particular range cell and each subnetwork is responsive to targets within a set of target ranges, wherein different subnetworks are responsive to respectively different non-overlapping sets of target ranges.

In accordance with a second aspect, a method of processing a radar signal comprises forming a time series by time sampling in-phase and quadrature-phase components of a down-converted radar return signal, forming a first plurality of first weighted sums, and forming a second plurality of second weighted sums. Each component of the down-converted radar return signal comprises an associated waveform and the time series comprises a plurality of elements. Each first weighted sum comprises a sum of first values weighted by a corresponding set of first weights, and each first value is a first function of a different element of the time series. Each second weighted sum comprises a sum of second values weighted by a corresponding set of second weights. The first plurality of first weighted sums comprises a third plurality of mutually exclusive subsets of the first weighted sums and the second plurality of second weighted sums comprises a fourth plurality of mutually exclusive subsets of the second weighted sums. Each second value of a second weighted sum of one of the fourth plurality of mutually exclusive subsets is a second function of a different first weighted sum of only one of the third plurality of mutually exclusive subsets of first weighted sums. The method further comprises adjusting the first and second sets of weights so that the third set of weighted sums of one of the fourth plurality of mutually exclusive subsets is substantially responsive only to targets in a first set of target ranges, and the third set of weighted sums of another of the fourth plurality of mutually exclusive subsets is substantially responsive only to targets in a second set of target ranges, whereby the first and second sets of target ranges are not overlapping.

In accordance with a third aspect, a method of training a neural network in a neural network radar processor comprises forming at least one first time series of in-phase and quadrature-phase components representing a down-converted radar return signal from a target space and applying the at least one first time series to an input layer of a neural network. Each component comprises an associated waveform and the at least one first time series comprises a plurality of elements. The input layer comprises a first plurality of first nodes. One of the elements of the at least one first time series is applied to each of the first plurality of first nodes, and different elements are applied to different first nodes. The neural network further comprises a second plurality of nodes, a third plurality of corresponding weight values operative at the second plurality of nodes, and a fourth plurality of output nodes. The method further comprises adjusting the third plurality of corresponding weight values so that an output signal at each of the fourth plurality of output nodes is representative of the target space. The at least one first time series is selected from a time series representative of a target space, a time series with a leakage signal and a time series with a DC bias; the target space is selected from a target space with a variation of target reflection size, a target space with target fluctuation, a target space with a variation of target position relative to the radar, a target space with a variation in target speed relative to the radar, a target space with a variation in a target viewing angle, a target space with a variation in target shape, a target space with a variation in target size, a target space with a variation in antenna beam pointing angle, a target space with background clutter, and a target space with glint. For the at least one first time series selected from a time series with a leakage signal but no target, a time series with a DC bias but no target, and a time series representing a target space with background clutter, the third plurality of corresponding weight values are adjusted so that the output signal at each of the fourth plurality of output nodes tend towards a nullity.

These and other objects, features, and advantages of the instant invention will be more fully understood after reading the following detailed description of the preferred embodiment with reference to the accompanying drawings. While this description illustrates the application of the instant invention in predictive crash sensing system using LFMCW radar, it will be understood by one with ordinary skill in the art that the instant invention can also be applied to general FMCW radar signal processing for identifying the range and velocity of one or more targets.

BRIEF DESCRIPTION OF THE DRAWINGS

FIG. 1b illustrates the LFMCW radar processing operations as implemented by a single processor with equivalent throughput to the steps illustrated in FIG. 1a;

FIG. 7 illustrates a block diagram of a neural network radar processor;

FIG. 8 illustrates a boundary of a detection region of a radar signal;

DETAILED DESCRIPTION OF THE PREFERRED EMBODIMENT(S)

Figure 2:
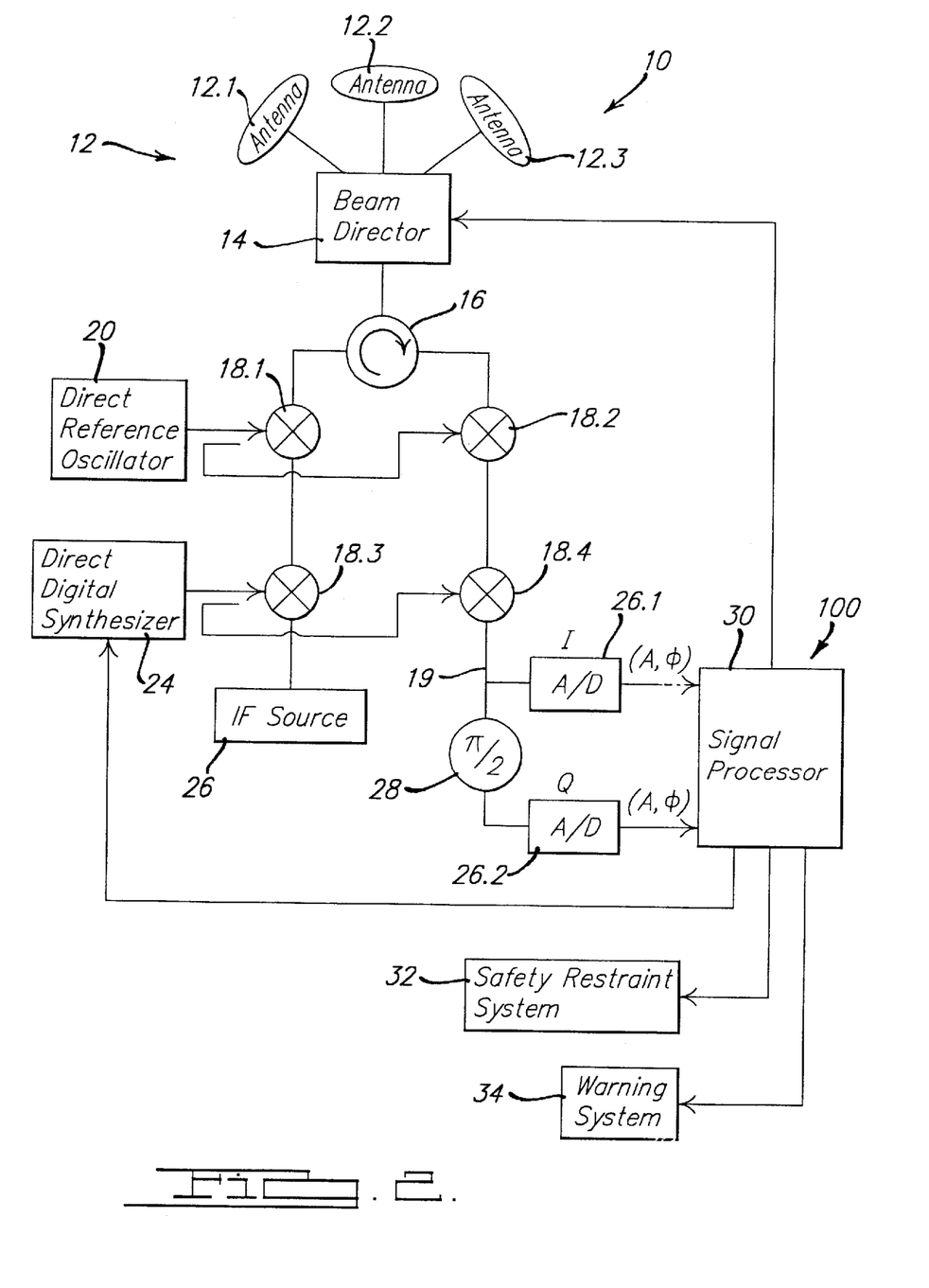
FIG. 2 is a block diagram of a front-end to a neural network radar signal processor.

Referring to FIG. 2, a radar system 10 incorporates a direct digital synthesizer (DDS) 24 to synthesize a specific sequence of frequencies under the control of a signal processor 30. The direct digital synthesizer 24 varies the generated frequencies relatively quickly, for example by changing frequency within 40–100 nanosecond intervals. The direct digital synthesizer 24 may, for example, be developed from a single custom broadband device or from an off-the-shelf narrow band synthesizer with a comb filter network of offset frequencies which cover the entire desired frequency band, as is well understood by one having ordinary skill in the art. An intermediate frequency (IF) source 26 is mixed with the output of the direct digital synthesizer 24 by a mixer 18.3, and the output from the mixer 18.3 is further up-converted by mixing with the output from a direct reference oscillator (DRO) 20, or a Gunn diode, by a mixer 18.1 so as to produce an RF transmission signal, for example having a frequency of approximately 47 GHz. The RF transmission signal passes through a circulator 16 into an antenna beam director 14 under control of the signal processor 30 which causes the signal to be transmitted by one or more of one or more antennas 12.1, 12.2, 12.3 so as to illuminate a region of interest proximate a vehicle in which the radar system 10 is installed. The antenna system 12 is not limited to any one particular configuration, and for example may comprise either a plurality of fixed antennas 12.1, 12.2, 12.3, a single moveable antenna, or a phased array antenna.

The transmitted signal is backscattered from one or more either fixed or moving targets, and then received by the antenna system 12. The received signal is then directed by the circulator 16 to a mixer 18.2 which down-converts the signal by mixing with the output from a direct reference oscillator 20, and the down-converted signal is mixed with the output of the direct digital synthesizer 24 by a mixer 18.4 where it is further down converted so as to form a modulated IF radar signal, also known as a down-converted radar signal 19. The modulated IF radar signal is phase shifted by a quadrature phase shifter 28, and both the modulated IF radar signal and the quadrature phase shifted version thereof are sampled by respective A/D converters 26.1, 26.2 so as to provide the signal processor 30 with a complex measure comprising the amplitude and phase (A, φ) of the modulated IF radar signal. The signal processor detects the range and velocity of targets within the field of view of the radar system 10 and predicts whether or not a collision will occur, and if so, sends a signal to another device or system that for example either provides a warning to the driver, takes evasive action to avoid the collision, or provides protection to the occupants of the vehicle should a collision be unavoidable. For example, as illustrated in FIG. 2, the radar system sends an appropriately timed signal to control the activation of the safety restraint system 32 so as to mitigate injury to the occupant, and/or sends a signal to a warning device 34 to warn the driver of an impending collision.

Figure 3:
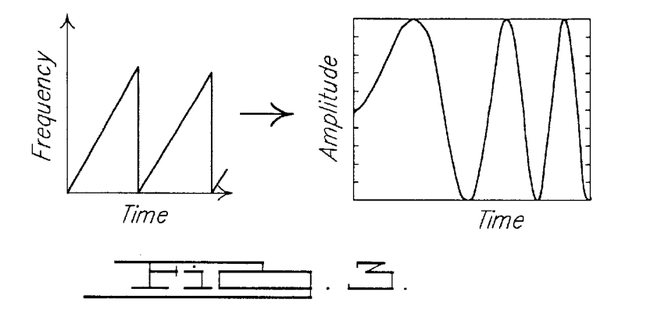
FIG. 3 illustrates a continuous LFMCW radar signal.

Referring to FIG. 3, a linear frequency modulated continuous wave (LFMCW) radar signal repetitively linearly sweeps through a predefined range of frequencies. The radar signal transmitted from the antenna system 12 illuminates, and is backscattered by, the target. The backscattered signal is then received by the antenna system 12, after undergoing a delay corresponding to the round trip distance between the radar system 10 and the target. The received backscattered signal is mixed with the transmitted signal, or a copy thereof, to generate a modulated IF radar signal, wherein the frequency of the modulated IF radar signal is proportional to the range to the target.

Figure 4:
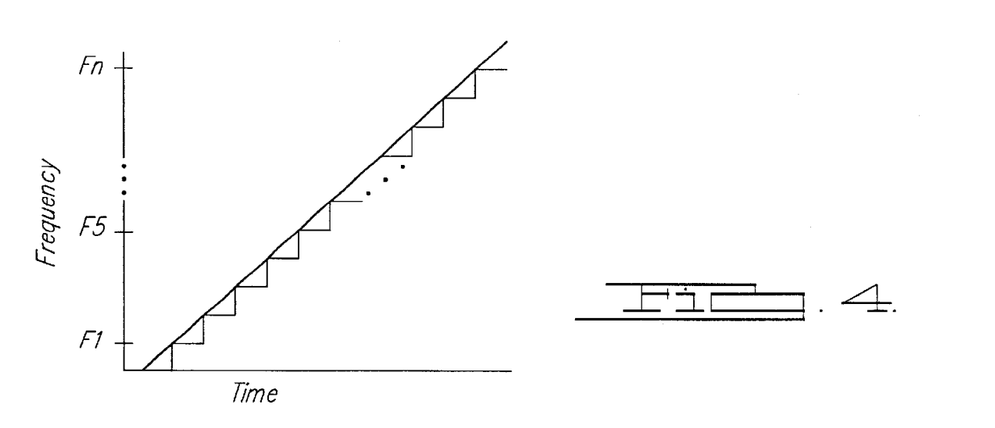
FIG. 4 illustrates a stepped LFMCW radar signal in frequency vs. time space.

Referring to FIG. 4, illustrating an example of the frequency variation of a signal from the direct digital synthesizer 24, a linear frequency modulated continuous wave (LFMCW) radar signal may be approximated by using a stepped frequency modulation signal. For example, the signal processor 30 of FIG. 2 steps the frequency of the direct digital synthesizer 24, which then generate a signal in accordance with FIG. 4.

Figure 5:
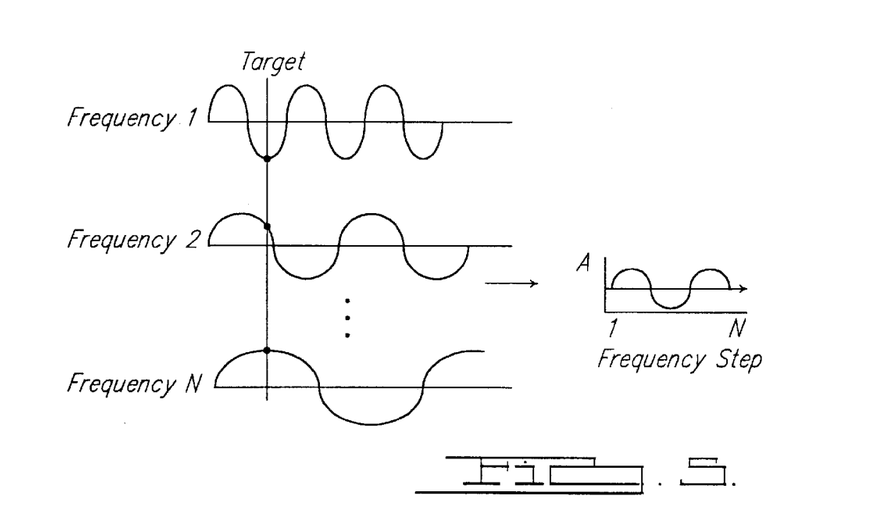
FIG. 5 illustrates a stepped LFMCW radar signal in amplitude vs. time space for several frequency steps.

Referring to FIG. 5, for a given target at a given range, the instantaneous amplitude of the return signal from each frequency step is different for different frequency steps because the range to the target corresponds to a different phase for each frequency step resulting in a different value from the associated sine wave. For a target at a specific range, the LFMCW radar target detection system provides a sinusoidal IF modulated signal from the IF mixer 18.4 having a frequency that corresponds to the range to the target. Accordingly, the neural network processor operates to detect discrete frequency signals, such as a highly correlated sinusoidal signal corresponding to a target, in a noisy background that is random and weakly correlated—a task that is suited for neural networks.

The range of the target can be deduced from the frequency of the received signal. The transmitted signal can be written as:

$$S_T = A_T e^{j\phi_T(t)}$$

$$\phi_T(t) = f_0 t + \tfrac{1}{2} f_m t^2 + \phi_0$$

where $f_0$, $f_m$ and $\phi_0$ are the initial frequency, the sweeping frequency rate and initial phase respectively. The backscattered signal received by the radar is given by:

$$S_R = A_R e^{j\phi_R(t)}$$

$$\phi_R(t) = f_0 t + \tfrac{1}{2} f_m t^2 - \tfrac{1}{2} f_m t_r^2 \phi_0$$

where $t_r$ is the time for the wave to travel back from the target. Letting R be the target range and c be the propagation speed of the associated transmitted and backscattered signals, then $$t_r = \frac{2R}{c},$$

Comparing $S_R$ and $S_T$, $$f_T - f_R = f_m t_r$$

where $f_T$ and $f_R$ are current transmitting frequency and received signal frequency. Therefore, $$R = \frac{f_T - f_R}{2f_m}c.$$

For purposes of comparison, in a conventional FMCW radar processor, the FMCW radar signal is processed with the steps of 1) DC bias removal, 2) leakage removal, 3) Fast Fourier Transform, and 4) Constant False Alarm Rate (CFAR) detection so as to provide a measure of range to the backscattering targets in view of the radar system, wherein a constant false alarm rate detection process based upon order statistics is typically used to obtain the ranges of true targets and to maintain a stable false alarm rate because such a process is relatively immune to the complex noise and clutter characteristics of the returned radar signal.

Figure 6A:
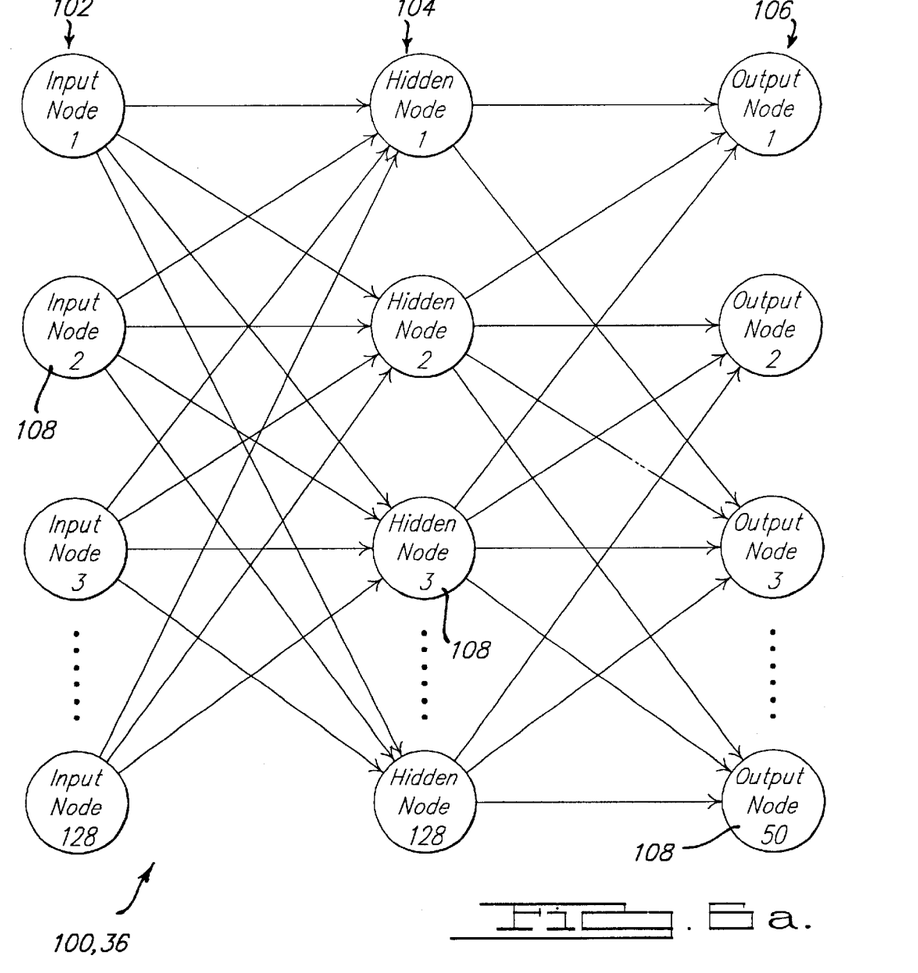
FIG. 6a illustrates a multilayer perceptron neural network with one hidden layer.

Referring to FIG. 6a, in contrast, the radar system 10 herein incorporates a multiple layer perceptron (MLP) neural network 100 for detecting targets and associated ranges from respective time series data sampled by the A/D converters 26.1, 26.2 from the modulated IF radar signal. The inputs to the network are amplitude values that are obtained from a vector time series sampled in time from the A/D converters 26.1, 26.2, wherein vector value comprises the in-phase and quadrature phase amplitudes of the radar signal at a particular point in time, corresponding to the return of a specific frequency step of the radar in the associated LFMCW sweep. The neural network 100 comprises an input layer 102, one or more hidden layers 104 and an output layer 106, each layer comprising a plurality of nodes 108 (or neurons), which are the basic processing elements of the neural network 100.

Figure 6B:
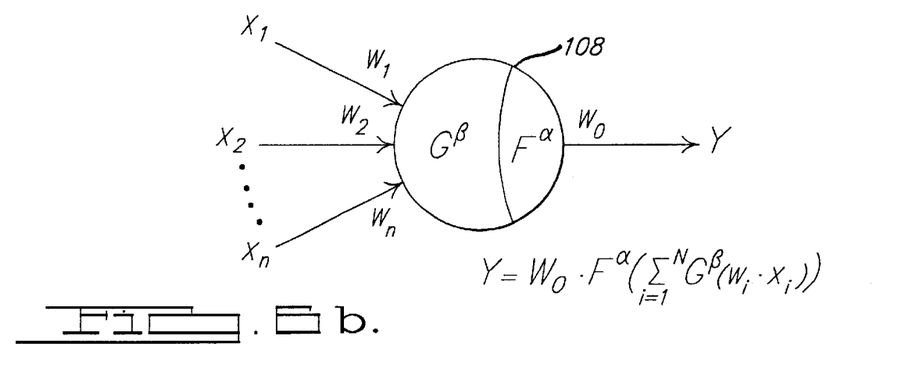
FIG. 6b illustrates an example of a generalized node of a neural network.

Referring to FIG. 6b, a generalized node 108 of the neural network 100 comprises a plurality of inputs $X_1, X_2 \ldots X_n$ and a corresponding plurality of weights $w_1, w_2, \ldots w_n$. A function $G^\beta(\ )$ operates on each product of an input and a corresponding weight, and a function $F^\alpha(\ )$ operates the sum of the values from the function $G^\beta(\ )$ over all inputs, wherein $\alpha$ and $\beta$ represent respect sets of one or more parameters of the respective functions. The output Y of the node 108 is given by the product of the value from the function $F^\alpha(\ )$ times an output weight $w_0$. Accordingly, each input to each node 108 has a respective weight, and the node 108 generates as an output a transformation of the weighted summation of the inputs to that node, wherein the transformation is generally nonlinear and is typically either a hyper tangent, sigmoid, pure linear or hard limit function.

Responsive to a different sample of the in-phase modulated IF radar signal being fed to one of each pair of input nodes, and to a respective different sample of the quadrature-phase modulated IF radar signal being fed to the other of each pair of input nodes, each respective output of the output nodes corresponds to the presence of a target at the respective range corresponding to the respective output node. The neural network 100 can be implemented with a neural network processor integrated circuit, also known as a neural network processor chip 36, which provides for reduced cost and improved reliability.

The weights and transfer function parameters are obtained from a standard network training process—such as backpropagation—using examples that account for the expected variations of the signal. The particular selection of examples is an important aspect of neural network design, in that a neural network can only be expected to solve problems for which it has been trained. Accordingly, the neural network is trained using signals germane to a FMCW radar predictive crash sensing system, particularly signals and effects that contribute to variations in target return signals, including but not limited to variations in the following:

1. effective target reflection sizes;
2. target fluctuation (change of effective reflection size during its existence);
3. target position/range relative to host radar;
4. target speed relative to host radar;
5. target viewing angles;
6. target shapes and sizes (e.g. compact and luxury cars, trucks, etc.);
7. antenna beam pointing angles;
8. background clutter (ground and atmospheric such as rain, snow, etc.);
9. glint (i.e. the interaction of returns from different objects which is stronger at closer ranges);
10. leakage; or
11. DC bias.

For example, data subsets corresponding to each possible target range are formed and used to teach the network to detect the targets in actual radar background clutter. The neural network 100 learns how to detect these targets at each possible range the appropriate weights and thresholds are generated and applied at each node and each layer of the network shown in FIG. 6a.

For example, the time series of various leakage signals, background clutter signals, or DC bias signals are applied to the input layer 102 of the neural network 100 and the weights and parameters (e.g. thresholds) of the neural network 100 are adjusted so that the outputs from the output nodes tend towards a nullity. Furthermore, the time series corresponding to various targets located at various distances, moving with various velocities, and presenting various fluctuations are applied to the input layer 102 of the neural network and the weights and parameters of the neural network 100 are adjusted so that the outputs from the output nodes tend towards indicating the presence of one or more targets corresponding to the input data at the corresponding range or ranges.

A model for a target return signal including the above factors can be written as:

$$S = D + L + \sum_{i=1}^{n_T} S_i + \sum_{j=1}^{n_c} S_{cj}$$

where D is the DC bias, L is the leakage signal, $S_i$ is return signal of target i, and $S_{cj}$ is return of clutter j. Further, D, L, $S_i$ and $S_{cj}$ are modeled as random number or processes:

$$S_i = A_i e^{j(2\pi f_i t + \phi_i)}$$

$$S_{cj} = A_{cj} e^{j(2\pi f_{cj} t + \phi_{cj})}$$

$$L = A_L e^{j(2\pi f_L t + \phi_L)}$$

$$D = D_0 + \Xi_D, \ \Xi_D \sim N(0, \sigma_D)$$

wherein, A, f and $\phi$ are signal amplitudes, frequencies and phase, respectively. More particularly, $A_i, f_i$ and $\phi_i$ are functions of target effective reflection sizes, target fluctuation, target-radar relative positions and target-radar relative speeds; $A_{cj}, f_{cj}$ and $\phi_{cj}$ are functions of the nature of background clutters; $A_L, f_L$ and $\phi_L$ are functions of leakage signal; $D_0$ and $\sigma_D$ are constants related to the radar system.

Referring to FIG. 7, a radar system 10 incorporating a neural network 100 is implemented in a commercially available or a custom neural network processor chip 36 designed to incorporate the radar chirp sequence, the weights and thresholds as inputs, and to output the appropriate target range corresponding to a given set of sampled data at the input to the neural network.

In operation, a set of pre-computed weights and parameters are fed in parallel with the incoming data stream into the neural network processor chip 36. The time sampled signal from the A/D converters 26.1 and 26.2 are fed to the neural network 100 through a Field Programmable Gate Array 38 (FPGA) to the neural network processor chip 36, which transforms the input time series in accordance with the weights, transfer functions, and interconnections of the neural network 100, causing the resulting outputs from the output nodes to be set for each range cell so as to indicate whether or not a target is present at the particular range. Multiple output bits are set if multiple targets are present at a given time, wherein each output bit corresponds to a specific range to the target, so that the number of targets and their range (or distance from the radar) is automatically provided by the neural network 100. Interface logic combines the separate outputs, for example about 50, into a series of, for example, 7 bit target range words from which the specific number and location of targets is found. The output of the neural network 100 is processed by a system controller 40, which for example controls a driver warning device 34 and/or a safety restraint system 32 responsive to the detection of targets by the neural network 100.

The neural network 100 is designed to detect one or more targets at respective ranges. Whereas a time domain signal is input to the neural network 100, the discrimination process for FMCW radar processing is more clearly understood in the frequency domain using signal amplitude A and frequency f, as illustrated in FIG. 8, wherein the frequency axis corresponds to the frequency of the time sampled modulated IF signal that further corresponds to target range. Accordingly, an FMCW neural network 100 radar processor in the frequency domain exhibits detection boundaries which are generally concave as a result of clutter returns and leakage. This necessitates using at least a three-layered MLP neural network 100 for this application. For a convex classification boundary of the classification problem, a two-layered neural network 100 is sufficient. By operating with time domain input signals, the neural network 100 is able to discriminate between a large amplitude leakage signal and a small amplitude target backscattered return signal.

The neural network 100 is designed in two steps. First, a simulation is designed to generate radar signals so that a training based on synthetic examples can provide a near-best setting of network parameters and reduce the efforts required for the collection of field examples. Second, as many field examples as possible are collected, and the network is trained with these field examples. A field example is obtained by recording the radar return signal and the output of a CFAR detector. The training of each radar beam is, for example, independent to account for the difference in the clutter distribution. Finally, to simplify the training, a group of 4 to 10 neural networks is, for example, used for each beam to cover a target range of 200 meters, although 50–150 meters may be sufficient. Accordingly, referring to FIG. 9, the neural network 100.1 comprises a plurality of neural sub-networks 120, each of which is isolated from the other except for the interconnections of the respective first hidden layers which connect to the input layer of the neural network 100, each neural sub-network 120 providing a subset of output ranges for a given radar beam. Each sub-network 120 is trained to be responsive to targets within a set of ranges, and by reducing the span of ranges in each set, the training effort is reduced. Alternately, the neural network 100.1 can be understood as a single network wherein the inputs to the second hidden layer are connected to only a subset of the outputs from the first hidden layer, subsequent hidden layers being fully interconnected. This approach to neural network design and training both simplifies the example collecting effort and reduces the training time, and increases the performance of the neural network. As an example, about 32–128 input samples are collected from each scan for input to the input layer of the neural network 100.1.

Figure 9:
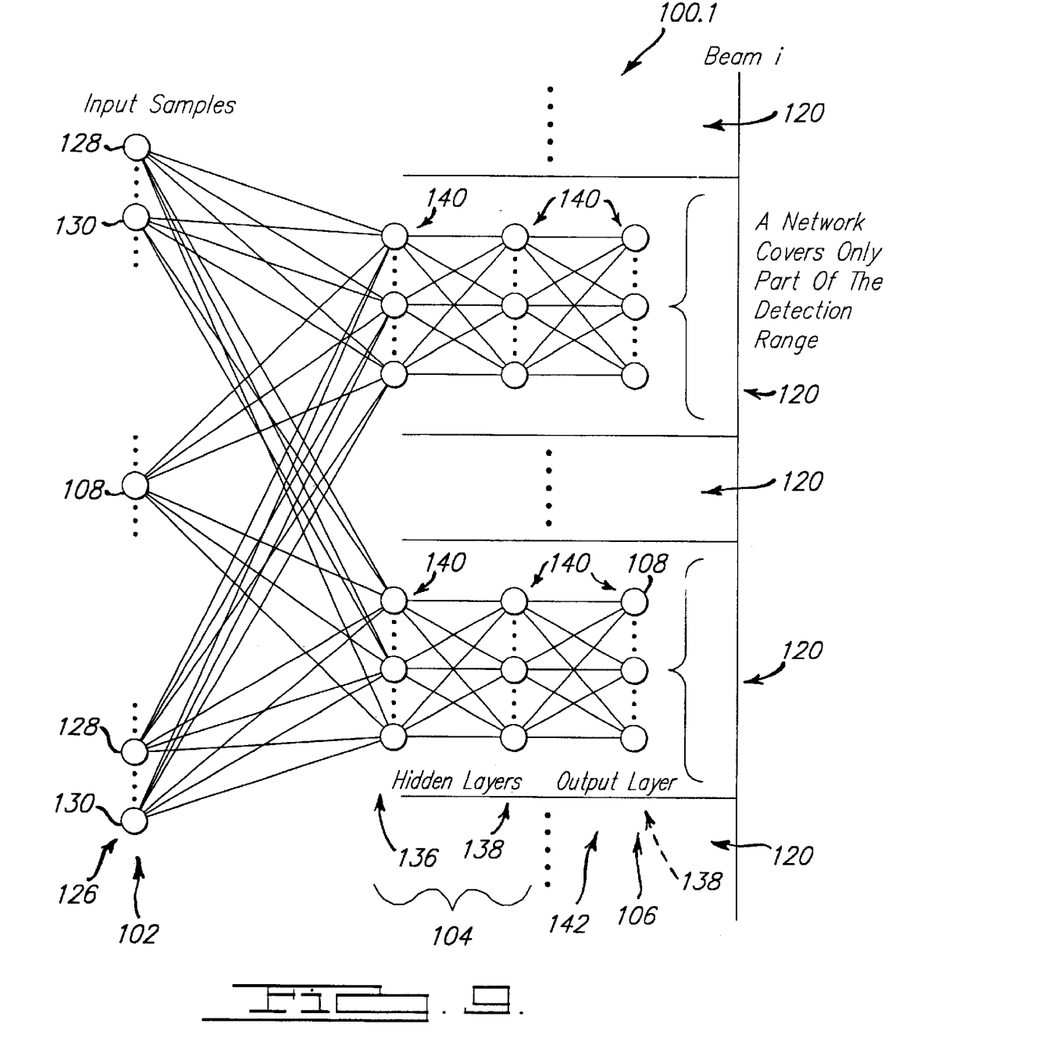
FIG. 9 illustrates a multilayer perceptron neural network with a plurality of hidden layers and mutually isolated sub-networks.

Several benefits derive from increasing the number of output nodes in each sub-network 120 as the associated ranges for that sub-network 120 increase in value. First, at a farther range, more range cells would need to be considered together in the associated sub-network 120 in order to maintain a sufficient detection probability. Second, at a nearer range, where clutter level is relatively high and fluctuating, clutter rejection capability can be maintained by grouping cells together. One example of a network architecture for a radar system 10 with a 150 meter range is to use eight (8) sub-networks 120 structured as follows:

| Sub-Network # | Span of Ranges m | # of Nodes/Layer |
| --- | --- | --- |
| 1 | 1–10 | 10 |
| 2 | 11–20 | 10 |
| 3 | 21–35 | 15 |
| 4 | 36–50 | 15 |
| 5 | 51–70 | 20 |
| 6 | 71–90 | 20 |
| 7 | 91–120 | 30 |
| 8 | 121–150 | 30 |

Stated in another way, the neural network 100.1 illustrated in FIGS. 7 and 9 comprises an input layer 102, a second layer 122 and least a third layer 124.

The input layer 102 comprises a first plurality of nodes 126, wherein each node 108 of the first plurality of nodes 126 has at least one input and an output. The first plurality of nodes 126 comprise first 128 and second 130 subsets of nodes. An input from each of the first subset of nodes 128 is operatively connected to a sample of a first time series 132 of radar data, and each node 108 of the first subset 128 is operatively connected to a different time sample. An input from each of the second subset of nodes 130 is operatively connected to a sample of a second time series 134 of radar data and the second time series 134 is of quadrature phase to the first time series. Each node 108 of the second subset 130 is operatively connected to a different time sample, and the first 128 and second 130 subsets of the first plurality of nodes 126 correspond in time.

The second layer comprises a second plurality of nodes 136, wherein each node 108 of the second plurality of nodes 136 has a plurality of inputs and an output, each output from the first plurality of nodes 126 is operatively connected to an input of each of the second plurality of nodes 136, and each input of the plurality of inputs of a node 108 of the second plurality of nodes 136 is operatively connected to a different node 108 of the first plurality of nodes 108.

The third layer comprise a third plurality of nodes 138, wherein each node 108 of the third plurality of nodes 138 has a plurality of inputs and an output, the third plurality is equal in number to the second plurality, the second plurality of nodes 136 comprises a fourth plurality of mutually exclusive subsets of nodes 140, the third plurality of nodes 138 comprises a fifth plurality of mutually exclusive subsets of nodes 140, the fifth plurality is equal in number to the fourth plurality, and any input to a node 108 of one of the fifth plurality of subsets is operatively connected only to an output of a node 108 of one of the fourth plurality of subsets.

The neural network 100.1 further comprises an output layer comprising a sixth plurality of nodes 142, wherein each node 108 of the sixth plurality of nodes 142 has a plurality of inputs and an output, the sixth plurality of nodes 142 comprises a seventh plurality of mutually exclusive subsets of nodes 140, the seventh plurality is equal in number to the fifth plurality, any node 108 of one of the seventh plurality of subsets is operatively connected only to a node 108 of one of the fifth plurality of subsets, an output of a node 108 of the sixth plurality of nodes 108 provides an indication of a target in a particular range cell, outputs of nodes 108 of one of the seventh plurality of subsets provide indications of targets in range cells for a first set of target ranges, and outputs of nodes 108 of another of the seventh plurality of subsets provide indications of targets in range cells for a second set of target ranges, whereby the first and second sets of target ranges are not overlapping.

In accordance with a second aspect, a method of processing a radar signal comprises forming a time series by time sampling in-phase and quadrature-phase components of a down-converted radar return signal, forming a first plurality of first weighted sums, and forming a second plurality of second weighted sums. Each component of the down-converted radar return signal comprises an associated waveform and the time series comprises a plurality of elements. Each first weighted sum comprises a sum of first values weighted by a corresponding set of first weights, and each first value is a first function of a different element of the time series. Each second weighted sum comprises a sum of second values weighted by a corresponding set of second weights. The first plurality of first weighted sums comprises a third plurality of mutually exclusive subsets of the first weighted sums and the second plurality of second weighted sums comprises a fourth plurality of mutually exclusive subsets of the second weighted sums. Each second value of a second weighted sum of one of the fourth plurality of mutually exclusive subsets is a second function of a different first weighted sum of only one of the third plurality of mutually exclusive subsets of first weighted sums. The method further comprises adjusting the first and second sets of weights so that the third set of weighted sums of one of the fourth plurality of mutually exclusive subsets is substantially responsive only to targets in a first set of target ranges, and the third set of weighted sums of another of the fourth plurality of mutually exclusive subsets is substantially responsive only to targets in a second set of target ranges, whereby the first and second sets of target ranges are not overlapping.

In an exemplary neural network designed to detect target range with linear detection boundaries of clutter returns and leakage, the shape of the classification problem becomes convex and a two-layered MLP neural network 100 is sufficient. For example, the following constraints, if applied to the neural network, further reduces the problem size: 1) target distance is in the range of 1 to 12 meters, 2) there are at most 5 targets within this distance, and 3) the minimum target separation is 0.6 meter. For example, 32 samples are collected from each scan and fed to the neural network.

In the exemplary system, a 32-10-12 MLP neural network 100 having 32 input nodes 108, 10 hidden neurons and 12 output neurons, trained with only a limited set of 20,000 training examples, provided a detection rate of 0.9057 and a false alarm rage of 0.0046, which is comparable to a conventional radar signal processor. Additional training could be expected to improve detection performance.

Figures 10, 11:
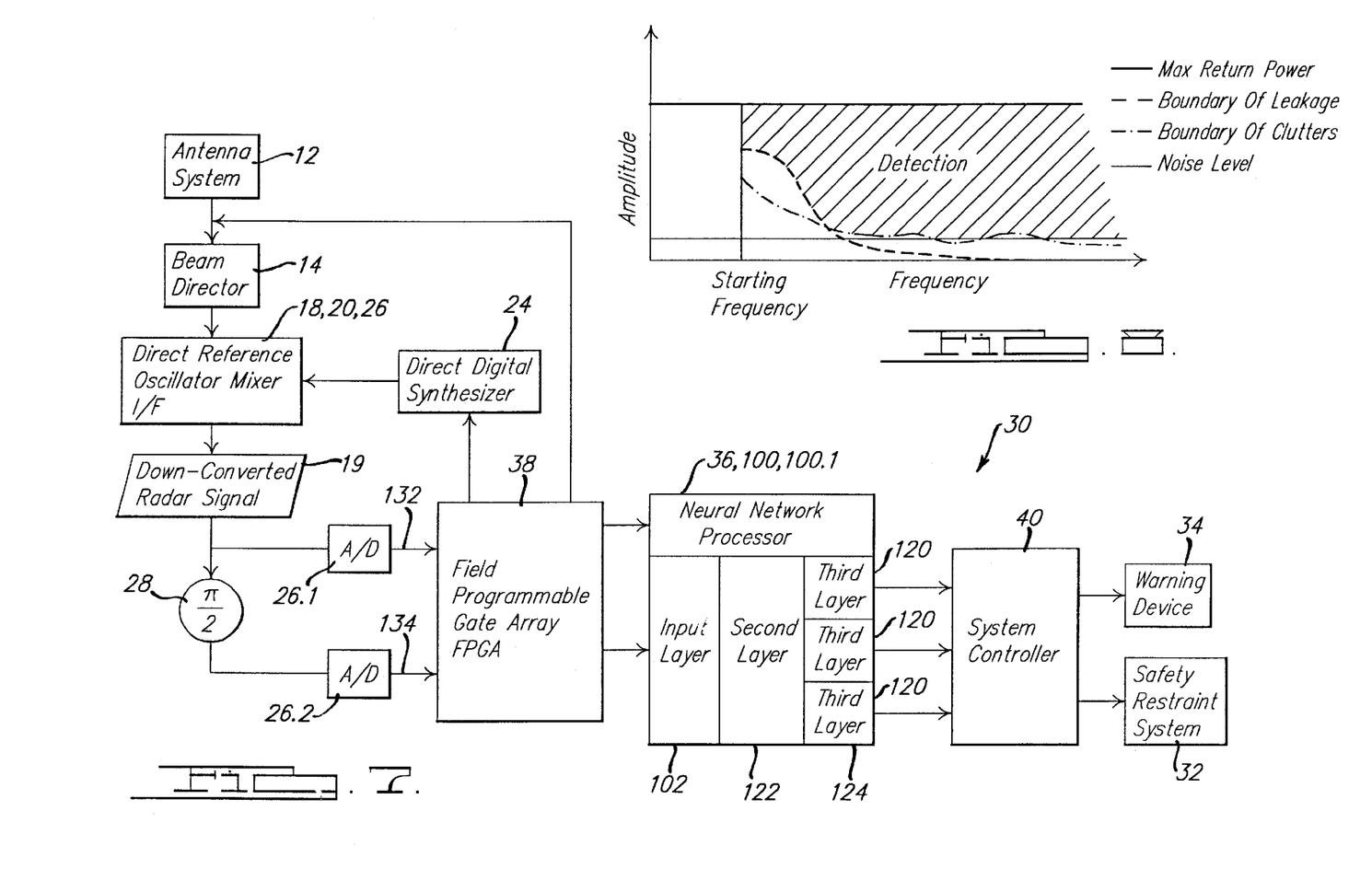
FIG. 10 illustrates a continuous LFMCW radar signal adapted for measuring target velocity.
Figure 10:
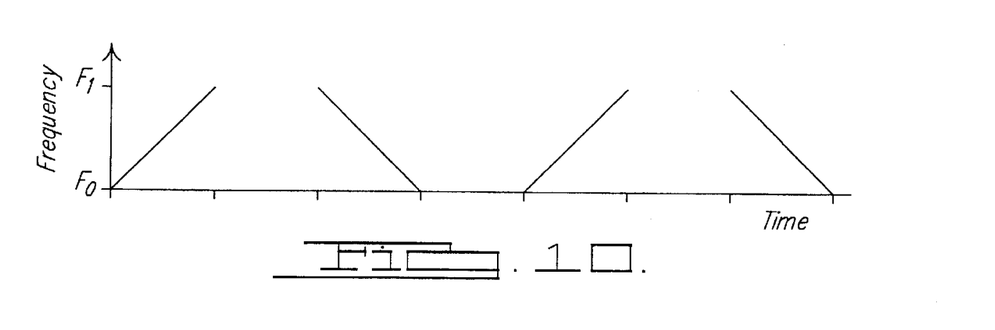

Referring to FIG. 10, the radar system 10 can be adapted to measure target velocity by incorporating an LFMCW radar signal comprising interleaved chirp signals wherein the signal frequency alternately increases and decreases with respect to time, further comprising a dwell period between alternate chirp signals so that, for example, the backscattered return signal from a chirp signal of increasing frequency with time doesn't mix with the reference signal of decreasing frequency with time. The signal processor 30 can be adapted to measure a first set of target ranges with the increasing frequency chirp signals and a second set of target ranges with the decreasing frequency chirp signals; after which the first and second sets of target ranges are compared so as to determine an associated set of target velocities and ranges that is consistent with the distinct sets of target ranges as measured by the neural network 100.

It should be understood that the neural network radar processor described herein is not limited to processing in-phase and quadrature-phase components of a down-converted LFMCW radar return signal. Generally, the input to the neural network radar processor is a time-sampled radar return signal. For example, the input of the neural network 100 could be fed with a time-sampled down-converted FMCW radar return signal rather than in-phase and quadrature phase components thereof.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

We claim:

1. A neural network radar processor, comprising:
   a. an input layer comprising a first plurality of nodes, wherein each node of said first plurality of nodes has at least one input and an output, an input from each of said first plurality of nodes is operatively connected to a sample of a time series of radar data, and each node of said first plurality of nodes is operatively connected to a different time sample;
   b. a second layer comprising a second plurality of nodes, wherein each node of said second plurality of nodes has a plurality of inputs and an output, each output from said first plurality of nodes is operatively connected to an input of each of said second plurality of nodes, and each input of said plurality of inputs of a node of said second plurality of nodes is operatively connected to a different node of said first plurality of nodes;
   c. a third layer comprising a third plurality of nodes, wherein each node of said third plurality of nodes has a plurality of inputs and an output, said third plurality is equal in number to said second plurality, said second plurality of nodes comprises a fourth plurality of mutually exclusive subsets of nodes, said third plurality of nodes comprises a fifth plurality of mutually exclusive subsets of nodes, said fifth plurality is equal in number to said fourth plurality, and any input to a node of one of said fifth plurality of subsets is operatively connected only to an output of a node of one of said fourth plurality of subsets; and
   d. an output layer comprising a sixth plurality of nodes, wherein each node of said sixth plurality of nodes has a plurality of inputs and an output, said sixth plurality of nodes comprises a seventh plurality of mutually exclusive subsets of nodes, said seventh plurality is equal in number to said fifth plurality, any node of one of said seventh plurality of subsets is operatively connected only to a node of one of said fifth plurality of subsets, an output of a node of said sixth plurality of nodes provides an indication of a target in a particular range cell, outputs of nodes of one of said seventh plurality of subsets provide indications of targets in range cells for a first set of target ranges, and outputs of nodes of another of said seventh plurality of subsets provide indications of targets in range cells for a second set of target ranges, whereby said first and second sets of target ranges are not overlapping.

2. A neural network radar processor as recited in claim 1, wherein said first plurality of nodes comprise first and second subsets of nodes, an input from each of said first subset of nodes is operatively connected to a sample of a first time series of radar data, each node of said first subset is operatively connected to a different time sample, an input from each of said second subset of nodes is operatively connected to a sample of a second time series of radar data, said second time series is of quadrature phase to said first time series, each node of said second subset is operatively connected to a different time sample, and said first and second subsets of said first plurality of nodes correspond in time.

3. A neural network radar processor as recited in claim 1, wherein said output layer is the same as said third layer, and said sixth plurality of nodes are the same nodes as said third plurality of nodes.

4. A neural network radar processor as recited in claim 1, wherein said output layer comprises a layer different from said third layer, and said sixth plurality of nodes are distinct from said third plurality of nodes.

5. A neural network radar processor as recited in claim 1, further comprising:

a. a direct digital synthesizer for generating a first oscillation signal having a first frequency of oscillation;

b. an intermediate frequency source for generating a second oscillation signal having a first frequency of oscillation;

c. a first mixer operatively connected to said direct digital synthesizer and to said intermediate frequency source for generating from said first and second oscillation signals a third oscillation signal having a third frequency of oscillation;

d. a direct reference oscillator for generating a fourth oscillation signal having a fourth frequency of oscillation e. a second mixer operatively connected to said direct reference oscillator and to the output of said first mixer for generating from said third and fourth oscillation signals a fifth oscillation signal having a fifth frequency of oscillation;

f. a circulator operatively connected to the output of said second mixer;

g. at least one transmitting antenna for illuminating the object with a transmitted RF signal, whereby said at least one transmitting antenna is operatively connected to said circulator, whereby said circulator couples said fifth oscillation signal into said at least one transmitting antenna, said at least one transmitting antenna radiates said fifth oscillation signal;

h. at least one receiving antenna for receiving as a received RF signal a component of said transmitted RF signal reflected by the object, whereby said at least one receiving antenna is operatively connected to said circulator, said at least one receiving antenna receives said reflected component;

i. a third mixer operatively connected to said circulator and to said direct reference oscillator, whereby said circulator couples said received RF signal into said third mixer and said third mixer generates from said received RF signal and said fourth oscillation signal an intermediate RF signal;

j. a fourth mixer operatively connected to said direct digital synthesizer and to the output of said third mixer for generating from said first oscillation signal and said intermediate RF signal detected RF signal;

k. a quadrature phase shifter operatively connected to the output of said fourth mixer for shifting the phase of said detected RF signal by ninety degrees so as to create a phase-shifted detected RF signal;

l. a first analog-to-digital converter for sampling said detected RF signal, so as to generate said first time series;

m. a second analog-to-digital converter for sampling said phase-shifted detected RF signal, so as to generate said second time series; and n. a signal processor operatively connected to said first and second analog-to-digital converters and to said direct digital synthesizer, whereby said signal processor controls the operating frequency of said direct digital synthesizer responsive to a ode from said signal processor, said code comprises a plurality of levels, each said level maintained for a period of time, said plurality of levels are substantially uniformly spaced, said period of time is sufficient for the propagation of said transmitted RF signal from said transmitting antenna to a target to said receiving antenna, and said code is repeated as a repetitive sequence.

6. A neural network radar processor as recited in claim 5, wherein said code comprises a first plurality of steps of increasing frequency followed by a second plurality of steps of decreasing frequency.

7. A neural network radar processor as recited in claim 6, wherein said code further comprises a dwell period between said first and second pluralities of steps.

8. A method of processing a radar signal with a neural network, comprising:

a. forming a time series by time sampling a radar return signal, wherein said time series comprises a plurality of samples;

b. forming a first plurality of first weighted sums, wherein each first weighted sum comprises a sum of first values weighted by a corresponding set of first weights, and each first value is a first function of a different sample of said time series;

c. forming a second plurality of second weighted sums, wherein each second weighted sum comprises a sum of second values weighted by a corresponding set of second weights, said first plurality of first weighted sums comprises a third plurality of mutually exclusive subsets of said first weighted sums, said second plurality of second weighted sums comprises a fourth plurality of mutually exclusive subsets of said second weighted sums, and each said second value of a second weighted sum of one of said fourth plurality of mutually exclusive subsets is a second function of a different first weighted sum of only one of said third plurality of mutually exclusive subsets of first weighted sums; and d. adjusting said first and second sets of weights so that said third set of weighted sums of one of said fourth plurality of mutually exclusive subsets is substantially responsive only to targets in a first set of target ranges, and said third set of weighted sums of another of said fourth plurality of mutually exclusive subsets is substantially responsive only to targets in a second set of target ranges, whereby said first and second sets of target ranges are not overlapping.

9. A method of processing a radar signal with a neural network as recited in claim 8, wherein the operation of forming a time series comprises time sampling in-phase and quadrature-phase components of a down-converted radar return signal.

10. A method of processing a radar signal with a neural network as recited in claim 8, wherein said first function comprises at least one first parameter and said second function comprises at least one second parameter, further comprising the operation of adjusting said at least one first parameter and said at least one second parameter so that said third set of weighted sums of one of said fourth plurality of mutually exclusive subsets is substantially responsive only to targets in a first set of target ranges, and said third set of weighted sums of another of said fourth plurality of mutually exclusive subsets is substantially responsive only to targets in a second set of target ranges, whereby said first and second sets of target ranges are not overlapping.

11. A method of training a neural network in a neural network radar processor, comprising:

a. forming at least one first time series representing a radar return signal from a target space, wherein each said component comprises an associated waveform and said at least one first time series comprises a plurality of samples;

b. applying said at least one first time series to an input layer of a neural network, wherein said input layer comprises a first plurality of first nodes, one of said plurality of samples is applied to each of said first plurality of first nodes, a different of said plurality of samples is applied to different said first nodes, said neural network comprises a second plurality of nodes, a third plurality of corresponding weight values operative at said second plurality of nodes, and a fourth plurality of output nodes; and c. adjusting said third plurality of corresponding weight values so that an output signal at each of said fourth plurality of output nodes is representative of said target space, wherein said at least one first time series is selected from a time series representative of a target space, a time series with a leakage signal and a time series with a DC bias; said target space is selected from a target space with a variation of target reflection size, a target space with target fluctuation, a target space with a variation of target position relative to said radar, a target space with a variation in target speed relative to said radar, a target space with a variation in a target viewing angle, a target space with a variation in target shape, a target space with a variation in target size, a target space with a variation in antenna beam pointing angle, a target space with background clutter, and a target space with glint; and for said at least one first time series selected from a time series with a leakage signal but no target, a time series with a DC bias but no target, and a time series representing a target space with background clutter, said third plurality of corresponding weight values are adjusted so that said output signal at each of said fourth plurality of output nodes tend towards a nullity.

12. A method of training a neural network in a neural network radar processor as recited in claim 11, wherein said operation of forming at least one first time series comprises forming at least one first time series of in-phase and quadrature-phase components representing a down-converted radar return signal from a target space.

13. A method of training a neural network in a neural network radar processor as recited in claim 11, wherein said operation of adjusting said third plurality of corresponding weight values comprises a back propagation process.

14. A method of training a neural network in a neural network radar processor as recited in claim 11, wherein the operation of adjusting said third plurality of corresponding weight values comprises adjusting said third plurality of corresponding weight values so that for said at least one first time series selected from a time series with a leakage signal but no target, a time series with a DC bias but no target, and a time series representing a target space with background clutter, said output signal at each of said fourth plurality of output nodes tend towards a nullity.

15. A method of training a neural network in a neural network radar processor as recited in claim 11, wherein said neural network further comprises at least one function with at least one parameter, further comprising the operation of adjusting said at least one parameter so that for said at least one first time series selected from a time series with a leakage signal but no target, a time series with a DC bias but no target, and a time series representing a target space with background clutter, said output signal at each of said fourth plurality of output nodes tend towards a nullity.

16. A method of training a neural network in a neural network radar processor as recited in claim 11, wherein for said at least one time series representative of a target space having a target at a range, said operation of adjusting said third plurality of corresponding weight values further comprises adjusting said third plurality of corresponding weight values so that said output signal of an output node of said fourth plurality of output nodes corresponding to said range of said target tends towards a value indicative of said target at said range, and said output signals for other output nodes of said fourth plurality of output nodes tend towards a nullity if no target is present at a range corresponding to said other output nodes.

17. A method of training a neural network in a neural network radar processor as recited in claim 11, wherein said neural network further comprises at least one function with at least one parameter, further comprising the operation of adjusting said at least one parameter so that for said at least one time series representative of a target space having a target at a range, said operation of adjusting said at least one parameter further comprises adjusting said at least one parameter so that said output signal of an output node of said fourth plurality of output nodes corresponding to said range of said target tends towards a value indicative of said target at said range, and said output signals for other output nodes of said fourth plurality of output nodes tend towards a nullity if no target is present at a range corresponding to said other output nodes.

18. A method of training a neural network in a neural network radar processor as recited in claim 11, wherein the operation of forming said at least one first time series comprises an operation selected from the operations of 1) replaying a recording of a radar return signal from a radar system and 2) forming said at least one first time series of a simulated radar return signal.

* * * * *